United States Patent
Obara et al.

(10) Patent No.: US 7,936,827 B2
(45) Date of Patent: May 3, 2011

(54) INFORMATION PROCESSING APPARATUS HAVING RECEIVING DEVICE THAT RECEIVES VIDEO DATA

(75) Inventors: Mitsuhiko Obara, Fussa (JP); Toshikazu Mukaiyama, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1430 days.

(21) Appl. No.: 11/395,165

(22) Filed: Apr. 3, 2006

(65) Prior Publication Data
US 2006/0245720 A1 Nov. 2, 2006

(30) Foreign Application Priority Data
Apr. 28, 2005 (JP) .................. 2005-133192

(51) Int. Cl.
H04N 7/12 (2006.01)
H04N 3/27 (2006.01)
(52) U.S. Cl. .................. 375/240.26; 348/554
(58) Field of Classification Search ............. 375/240.26; 348/554
See application file for complete search history.

(56) References Cited

U.S. PATENT DOCUMENTS

| | | | | |
|---|---|---|---|---|
| 5,898,232 A | * | 4/1999 | Reents et al. | 307/18 |
| 6,731,346 B1 | * | 5/2004 | Nonomura et al. | 348/554 |
| 7,359,336 B2 | * | 4/2008 | Kuramoto | 370/252 |

FOREIGN PATENT DOCUMENTS

| | | |
|---|---|---|
| JP | 7-200106 | 8/1995 |
| JP | 7-212736 | 8/1995 |
| JP | 8-185247 | 7/1996 |
| JP | 9-80988 | 3/1997 |
| JP | 10-289039 | 10/1998 |
| JP | 11-175205 | 7/1999 |
| JP | 11-327706 | 11/1999 |
| JP | 2000-207817 | 7/2000 |
| JP | 2000-227893 | 8/2000 |
| JP | 2002-124014 | 4/2002 |
| JP | 2002-341849 | 11/2002 |
| JP | 2004-348186 | 12/2004 |

OTHER PUBLICATIONS

Notice of Reasons for Rejection mailed Apr. 27, 2010, from the Japanese Patent Office for Japanese Patent Application No. 2005-133192 (3 pages).

* cited by examiner

*Primary Examiner* — Y. Lee
*Assistant Examiner* — Richard Torrente
(74) *Attorney, Agent, or Firm* — Finnegan, Henderson, Farabow, Garrett & Dunner, L.L.P.

(57) ABSTRACT

An information processing apparatus includes a receiving device and a control unit. The receiving device includes a plurality of processing unit containing an interface unit. The control unit includes an input source detection module, a transfer instruction detection module and a power-saving control module. The input source detection module detects an input source necessary for execution of a video reproduction program. The transfer instruction detection module detects a video data transfer instruction from the video reproduction program. When the video data transfer instruction is detected, the power-saving control module enables some of the processing units except the interface unit and sets the others of the processing units in power-saving mode. The enabled processing units receive a video signal from the input source detected by the input source detection module and convert the video signal into video data of given format.

12 Claims, 8 Drawing Sheets

INFORMATION PROCESSING APPARATUS HAVING RECEIVING DEVICE THAT RECEIVES VIDEO DATA

CROSS-REFERENCE TO RELATED APPLICATIONS

This application is based upon and claims the benefit of priority from Japanese Patent Application No. 2005-133192, filed Apr. 28, 2005, the entire contents of which are incorporated herein by reference.

BACKGROUND

1. Field

One embodiment of the invention relates to an information processing apparatus such as a personal computer. For example, the invention relates to an information processing apparatus having a receiving device that receives video data from a required one of external sources.

2. Description of the Related Art

In recent years, various battery-operated portable personal computers such as a notebook personal computer have been developed. Recently, a portable personal computer including a receiving device such as a television (TV) tuner/capture unit has also been developed. The receiving device receives video data from a user's required one of external sources.

However, the power consumption of the above portable personal computer increases by that of the receiving device included therein. Even when TV broadcast program data is not reproduced or recorded using the receiving device, the operating time of the personal computer operated by a battery is shortened.

For example, Jpn. Pat. Appln. KOKAI Publication No. 10-289039 (prior art document) discloses a technique of decreasing power consumption of a personal computer incorporating a receiving device. The receiving device has a microcomputer. The microcomputer detects an operation mode of the receiving device in response to a mode setting signal from the main body of the personal computer. The microcomputer detects which of operation modes, a tuner input mode and an external input mode, the receiving device is set in. The microcomputer determines a function block in the receiving device as one required in the detected operation mode. Based on a result of the determination, the microcomputer supplies power only to the required function block in the receiving device.

In the technique of the prior art document, as described above, the microcomputer determines a function block in the receiving device as one required in an operation mode designated by a mode setting signal from the main body of the personal computer. Power is applied to only the function block that is determined as one required.

However, even though an operation mode of the receiving device is designated by a mode setting signal from the main body of the personal computer, the receiving device does not operate at once in the designated operation mode. The receiving device has only to receive video data from an external source corresponding to a designated operation mode and start to transfer the video data to the main body of the personal computer (capture transfer operation) only when it receives an instruction for transfer from the main body of the personal computer. In the technique of the prior art document, therefore, useless power is consumed in a function block corresponding to a designated operation mode even during which period the receiving device need not operate.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an information processing apparatus which has a bus used to transfer various data items including video data reproduced by execution of a video reproduction program and which is capable of displaying the data items on a display device. The information processing apparatus includes a receiving device and a control unit. The receiving device receives a video signal from an input source corresponding to one of a plurality of external sources, which is required for the execution of the video reproduction program, and converts the video signal into video data of given format. The receiving device includes a plurality of processing units containing an interface unit electrically connected to the bus. The interface unit is enabled by powering on the information processing apparatus to transmit the video data to the bus. The control unit controls the receiving device in accordance with the execution of the video reproduction program. The control unit includes an input source detection module, a transfer instruction detection module and a power-saving control module. The input source detection module detects an input source necessary for the execution of the video reproduction program. The transfer instruction detection module detects a video data transfer instruction from the video reproduction program. The power-saving control module enables some of the processing units except the interface unit when the transfer instruction detection module detects the video data transfer instruction, and sets others of the processing units in power-saving mode. Said some of the processing units receive a video signal from the input source detected by the input source detection module and converting the video signal into video data of given format.

Figure 1:
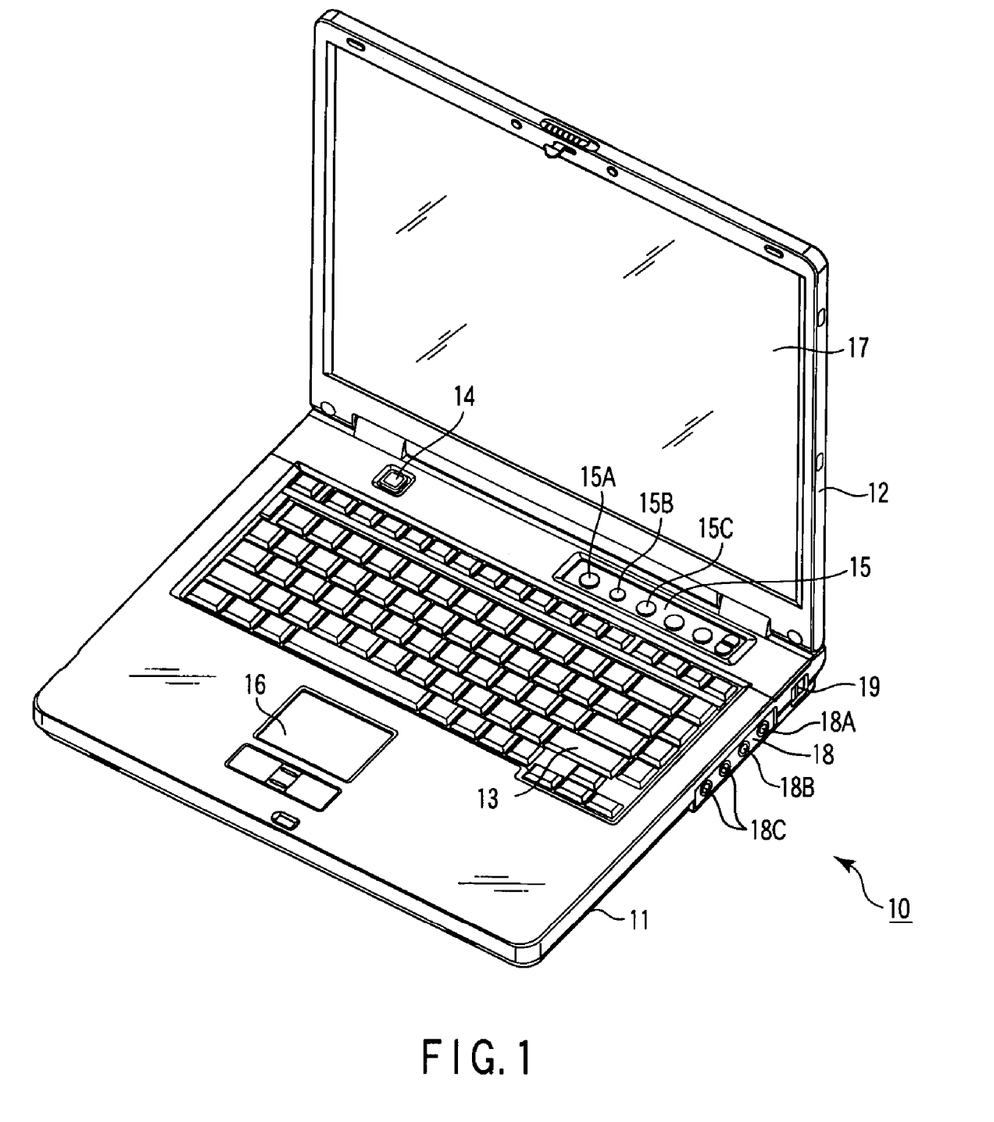
FIG. 1 is an exemplary perspective view of the outward appearance of a personal computer according to an embodiment of the invention.
Figure 2:
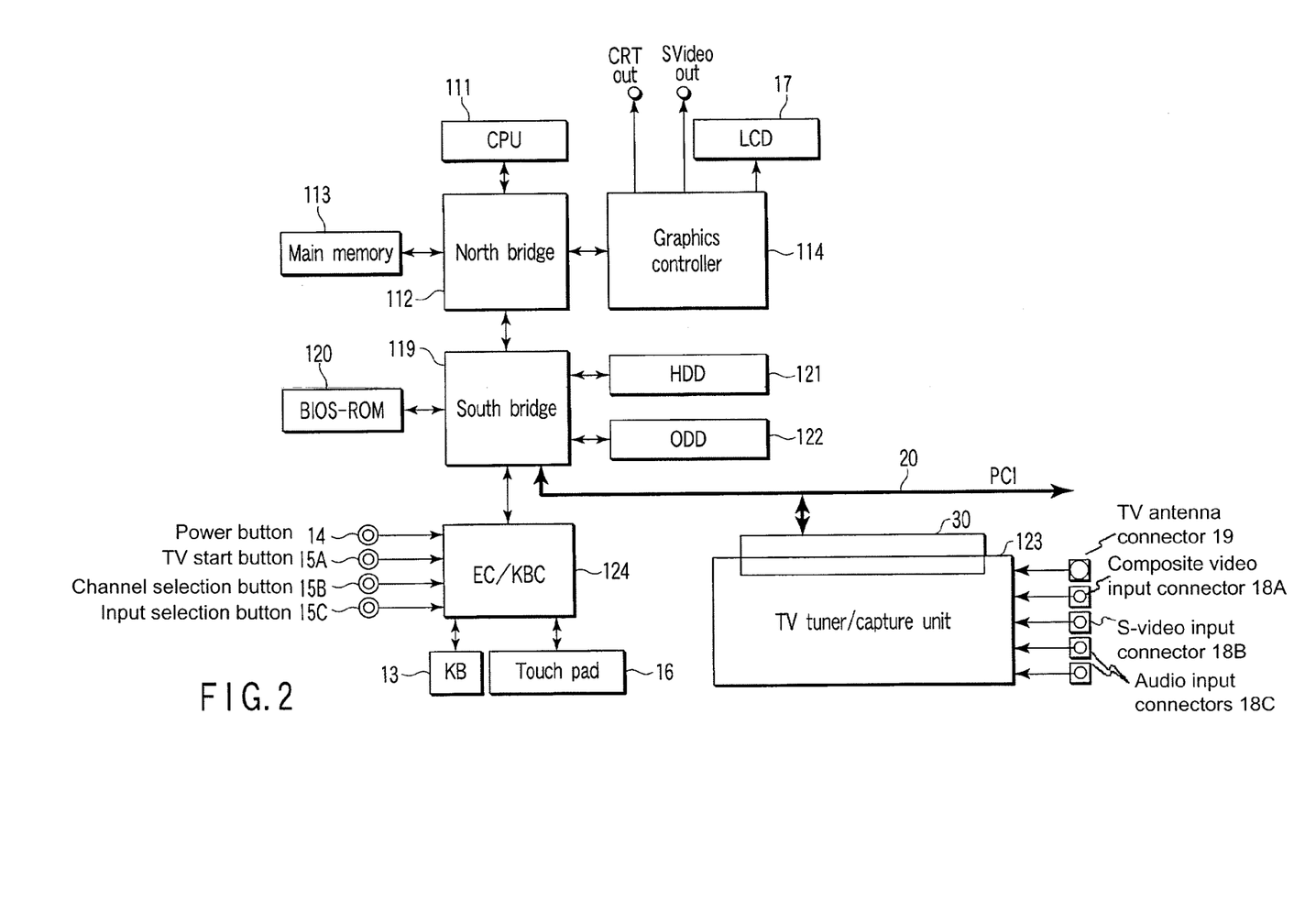
FIG. 2 is an exemplary block diagram of a system configuration of the personal computer shown in FIG. 1.

Referring first to FIGS. 1 and 2, the configuration of an information processing apparatus according to an embodiment of the invention will be described. The information processing apparatus is implemented as a notebook personal computer 10 as shown in FIG. 1. FIG. 1 is a perspective view of the notebook personal computer 10 whose display unit is open. The computer 10 includes a main body 11 and a display unit 12. The display unit 12 incorporates a display device that is composed of a liquid crystal display (LCD) 17. The display screen of the LCD 17 is located in almost the central part of the display unit 12.

The display unit 12 is attached to the main body 11 such that it can turn between its open position and closed position. The main body 11 has a thin box-shaped housing. A keyboard 13, a power button 14, an input operation panel 15 and a touch pad 16 are arranged on the top surface of the main body 11. The power button 14 is a button switch for powering on/off the computer 10.

The input operation panel 15 is an input device for inputting an input event corresponding to a depressed button. The input operation panel 15 includes a plurality of buttons for starting a plurality of functions, respectively. These buttons include a television (TV) start button 15A, a channel selection button 15B and an input selection button 15C. The TV start button 15A is a button switch for reproducing TV broadcast program data. When a user depresses the TV start button 15A, a TV application (TV application program) 50 (see FIG. 3) starts automatically. The TV application 50 is a video reproduction program for reproducing/recording TV broadcast program data and for reproducing/recording video data (audio/video data) supplied from an external device (external audio/video device). The channel selection button 15B is a button switch for selecting a channel for TV broadcast program data to be reproduced (viewed)/recorded. The channels for TV broadcast program data to be reproduced/recorded are selected in sequence each time a user depresses the channel selection button 15B. The input selection button 15C is a button switch for selecting an input source. The input source is roughly divided into a TV broadcast signal (TV input) and an external device (external video input). The TV input and the external video input are selected alternately as an input source each time a user depresses the input selection button 15C.

The main body 11 has an audio/video (AV) connector set 18 and a TV antenna connector 19 on its side. A TV antenna cable is connected to the TV antenna connector 19. The AV connector set 18 is a group of connectors for receiving an AV signal from an external device. The group of connectors includes a composite video input connector 18A, an S-video input connector 18B and two audio input connectors (audio-L and audio-R) 18C.

FIG. 2 is a block diagram of a system configuration of the computer 10 shown in FIG. 1. As shown in FIG. 2, the computer 10 includes a CPU 111, a north bridge 112, a main memory 113, a graphics controller 114, a south bridge 119, a BIOS-ROM 120, a hard disk drive (HDD) 121, an optical disk drive (ODD) 122, a TV tuner/capture unit 123 and an embedded controller/keyboard controller IC (EC/KBC) 124.

The CPU 111 is a processor for controlling an operation of the computer 10. The CPU 111 executes an operating system (OS) and various application programs which are loaded into the main memory 113 from the HDD 121. The OS has a window system for displaying a plurality of windows on the display screen. The CPU 111 also executes a basic input/output system (BIOS) stored in the BIOS-ROM 120. The BIOS is a program for controlling hardware.

Video data (TV broadcast program data, video data supplied from an external device, etc.) is usually displayed within a window corresponding to the TV application 50 (window mode). This window is located on the desktop screen. In the computer 10, video data can be displayed on the display screen of the LCD 17 in full-screen mode. In full-screen mode, only video data is displayed on almost all the area of the display screen.

The north bridge 112 is a bridge device that connects a local bus of the CPU 111 and the south bridge 119. The north bridge 112 incorporates a memory controller for controlling access to the main memory 113. The north bridge 112 has a function of communicating with the graphics controller 114 via an accelerated graphics port (AGP) bus and the like.

The graphics controller 114 is a display controller for controlling the LCD 17. The LCD 17 is used as a display monitor of the computer 10. The graphics controller 114 includes a video memory (VRAM). The graphics controller 114 generates a video signal for forming a display image to be displayed on the LCD 17 from display data written to the video memory (VRAM) by the OS/application program. Further, the graphics controller 114 has an interface for outputting an analog video signal to an external cathode ray tube (CRT) and an interface for outputting an analog video signal to the outside via an S-video output connector.

The south bridge 119 controls each of devices on a low pin count (LPC) bus. The south bridge 119 incorporates an integrated drive electronics (IDE) controller for controlling the HDD 121 and ODD 122. The south bridge 119 has a function of controlling access to the BIOS-ROM 120 and a function of controlling each of devices on a peripheral component interconnect (PCI) bus 20. The PCI bus 20 is used as a system bus. The TV tuner/capture unit 123 is connected to the PCI bus 20 via a bus connector 30. The bus connector 30 is composed of, for example, a mini PCI connector.

The TV tuner/capture unit 123 is a video data receiving device for receiving video data (TV broadcast signal, video data supplied from an external device, etc.) from an external source (input source). The TV tuner/capture unit 123 receives video data and outputs it onto the PCI bus 20. The received video data is compression-coded by a compression coding method such as MPEG 2 (MPEG: moving picture experts group) in the TV tuner/capture unit 123 and then output onto the PCI bus 20. The compression-coded video is decoded by the TV application 50 and displayed on the LCD 17. The TV application 50 can perform a recording process to store the compression-coded video data output from the TV tuner/capture unit 123 in the HDD 121.

The EC/KBC 124 is a single-chip microcomputer on which an embedded controller (EC) for managing power and a keyboard controller (KBC) for controlling the keyboard (KB) 13 and the touch pad 16 are integrated. The EC/KBC 124 has a function of powering on/off the computer 10 in accordance with a user's depression of the power button 14.

Figure 3:
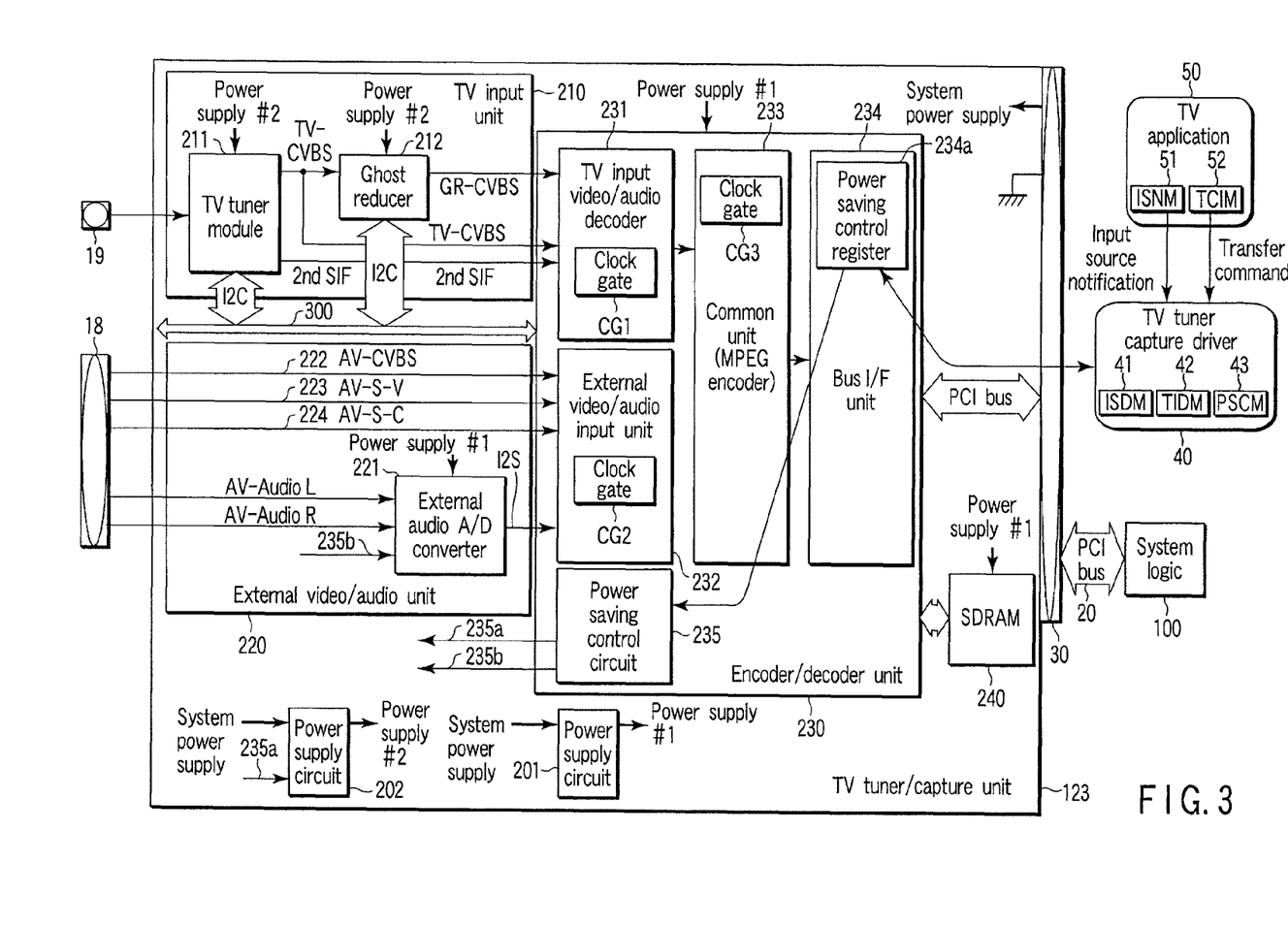
FIG. 3 is an exemplary block diagram of a configuration of a TV tuner/capture unit in the system configuration shown in FIG. 2.

FIG. 3 is a block diagram of a configuration of the TV tuner/capture unit 123 shown in FIG. 2. The TV tuner/capture unit 123 is connected to a system logic 100 of the computer 10 via the bus connector 30 and the PCI bus 20 as shown in FIG. 3. The system logic 100 serves as a host system of the TV tuner/capture unit 123. The system logic 100 includes the CPU 111, north bridge 112, main memory 113, graphics controller 114, south bridge 119, BIOS-ROM 120, HDD 121, ODD 122 and EC/KBC 124.

The TV application 50 includes an input source notification module (ISNM) 51 and a transfer command issuance module (TCIM) 52. The input source notification module 51 has a function of notifying a TV tuner/capture driver 40 of an input source in accordance with a user's operation. The transfer command issuance module 52 has a function of issuing a transfer command to the driver 40. The transfer command is used to instruct the driver 40 to start to transfer data (AV stream) including video data supplied from the input source. The input source is designated by the input source notification module 51.

The TV tuner/capture driver 40 is a control unit for controlling the TV tuner/capture unit 123. The driver 40 also manages the operating states of the unit 123. Assume here that the driver 40 is implemented by executing a given TV tuner/capture driver program (control program) by the CPU 111. The processing of the driver 40 can be handled as that of the CPU 111.

The TV tuner/capture driver 40 includes an input source detection module (ISDM) 41, a transfer instruction detection module (TIDM) 42 and a power-saving control module (PSCM) 43. The input source detection module 41 detects an input source notified by the TV application 50, or an input source required for the execution of the TV application 50. The transfer instruction detection module 42 detects a capture transfer instruction (video data transfer instruction) supplied from the TV application 50.

The power-saving control module 43 performs the following control when the transfer instruction detection module 42 detects a capture transfer instruction. The power-saving control module 43 enables only some processing units in the TV tuner/capture unit 123. The enabled processing units, which do not include a bus interface unit 234 (described later), process video signals that are supplied from the input source detected by the input source detection module 41. The power-saving control module 43 also sets all of the other processing units except the bus interface unit 234 in power-saving mode. The power-saving control module 43 also sets all of the processing units except the bus interface unit 234 in power-saving mode during which period video data (AV stream) is not transferred.

The TV tuner/capture unit 123 includes a first power supply circuit 201, a second power supply circuit 202, a TV input unit 210, an external video/audio unit 220, an encoder/decoder unit 230 and a synchronous DRAM (SDRAM) 240. The first power supply circuit 201 generates a first power supply voltage (firs power supply) #1 from a system power supply voltage (system power supply) #1 that is applied to the TV tuner/capture unit 123 from a power supply device in the system logic 100 through the bus connector 30. The first power supply voltage #1 is applied to the encoder/decoder unit 230 and the synchronous DRAM 240. The second power supply circuit 202 generates a second power supply voltage (second power supply) #2 from the above system power supply voltage #1 when a power-saving control signal 235*a* is inactive. The second power supply voltage #2 is applied to the TV input unit 210.

The TV input unit 210 is a first processing unit that receives a TV broadcast signal (TV signal) for carrying a video signal and an audio signal. The TV input unit 210 includes a TV tuner module 211 and a ghost reducer 212. The TV tuner module 211 and ghost reducer 212 are each enabled upon receipt of the second power supply voltage #2 from the second power supply circuit 202. The TV tuner module 211 and ghost reducer 212 are each connected to a serial bus 300. The serial bus 300 is, for example, an I²C bus.

The TV tuner module 211 is connected to the TV antenna connector 19 so as to receive a TV broadcast signal. Since the TV tuner module 211 is implemented as a multi-standard TV tuner, it is so configured that it can be tuned to various TV broadcast signal frequencies corresponding to different TV broadcast systems (e.g., NTSC-M/M, PAL-/I, PAL-B/G, SECAM-L/L', PAL-D/D). The TV tuner module 211 demodulates the received TV broadcast signal to generate a composite signal (TV-CVBS) format video signal, a 2nd SIF (sound intermediate frequency) format audio signal, and the like. In other words, the TV tuner module 211 is a processing unit (first processing unit) that receives a video signal and an audio signal from the TV broadcast signal serving as an external source. The video signal is supplied as a TV input from the TV tuner module 211 to a TV input video/audio decoder 231 (described later) in the encoder/decoder unit 230 via the ghost reducer 212. The video signal is also supplied as a TV input to the decoder 231 directly from the TV tuner module 211. The audio signal is also supplied to the decoder 231 as a TV input.

The ghost reducer 212 is a circuit that performs a ghost reduction process to reduce a ghost of a video signal supplied from the TV tuner module 211. The ghost reduction process is performed using a ghost cancel reference (GCR) signal contained in a vertical blanking interval (VBI) of the video signal. The ghost reducer 212 incorporates a ghost cancel filter. The ghost reducer 212 detects a GCR signal of the video signal and controls the tap coefficients of the ghost cancel filter in accordance with the distortion of the GCR signal. The TV broadcast system in which a GCR signal is superimposed on a TV broadcast signal is only the NTSC system adopted in Japan. The ghost reduction process can thus be performed effectively only when an NTSC signal of the NTSC system is received.

The external video/audio unit 220 is connected to the AV connector set 18. As described above, the AV connector set 18 is a group of connectors for receiving AV signals from an external device (external AV device) serving as an external source. In other words, the external video/audio unit 220 is a processing unit (first processing unit) that receives a video signal and an audio signal from an external source, like the TV input unit 210. The external video/audio unit 220 includes an external audio analog-to-digital (A/D) converter 221 and signal lines 222 to 224. The first power supply voltage #1, which is generated by the first power supply circuit 201, is applied to the external audio A/D converter 221. When the first power supply voltage #1 is applied, the external audio A/D converter 221 is enabled only during which period a power-saving control signal 235*b* is inactive. When the external audio A/D converter 221 is enabled, it receives an audio signal from the audio input connector 18C (see FIG. 2) of the AV connector set 18 and converts it into, e.g., I2S format digital audio data. The I2S format digital audio data is transferred to an external video/audio input unit 232 in the encoder/decoder unit 230. on the other hand, a composite video signal (CVBS) is received from the composite video input connector 18A (see FIG. 2) of the AV connector set 18 and transferred to the external video/audio input unit 232 via the signal line 222. An S-video (S-V) signal and an S-chroma (S-C) signal are received from the S-video input connector 18B (see FIG. 2) of the AV connector set 18 and transferred to the external video/audio input unit 232 via the signal lines 223 and 224.

The encoder/decoder unit 230 is, for example, a single-chip LSI. The first power supply voltage #1 is applied to the encoder/decoder unit 230. The encoder/decoder unit 230 includes a TV input video/audio decoder 231, an external video/audio input unit 232, a common unit 233, a bus interface unit 234 and a power-saving control circuit 235.

The TV input video/audio decoder 231 has a TV input port that receives a video signal (GR-CVBS) from the ghost reducer 212. The decoder 231 has another TV input port that receives a video signal (TV-CVBS) directly from the TV tuner module 211. The decoder 231 has still another TV input port that receives an audio signal (2nd SIF) from the TV tuner module 211.

The TV input video/audio decoder 231 decodes an input video signal into, for example, ITU-656 format digital video data. This decoding includes a Y/C separation process. The Y/C separation process is a process of increasing the quality of video data like the ghost reduction process. The Y/C separation process is a process of separating a composite signal (CVBS format video data) into a Y (luminance) signal and a C (chroma) signal. The ITU-656 format digital video data is transmitted to the common unit 233.

The TV input video/audio decoder 231 also decodes an input audio signal to generate, for example, I2S format digital audio data. The I2S format digital audio data is transmitted to the common unit 233.

The external video/audio input unit 232 has an external video input port that receives a composite video signal (CVBS) via the external video/audio unit 220. The unit 232 has another external video input port that receives an S-video (S-V) signal and an S-chroma (S-C) signal via the unit 220. The unit 232 generates, e.g., ITU-656 format digital video data from the composite video signal (CVBS) whose high-frequency component is eliminated by a low-pass filter. This video signal processing includes a Y/C separation process.

The external video/audio input unit 232 also generates, e.g., ITU-656 format digital video data from the S-video (S-V) signal and S-chroma (S-C) signal whose frequency components are each eliminated by a low-pass filter. This video signal processing includes a noise reduction process. The noise reduction process is a process for increasing the quality of video data like the ghost reduction process. The ITU-656 format digital video data generated by the external video/audio input unit 232 is transmitted to the common unit 233 together with the I2S format digital audio data to be input to the input unit 232 from the external audio A/D converter 221.

The TV input video/audio decoder 231 and external video/audio input unit 232 are processing units (second processing units) provided to correspond to a TV broadcast signal and an external device (external AV device) each serving as an external source. The TV input video/audio decoder 231 and external video/audio input unit 232 are also processing units (second processing units) that convert video signals received by the TV input unit 210 and external video/audio unit 220 into video data of a format common to the external sources (ITU-656 format digital video data).

The common unit 233 is an MPEG encoder (third processing unit) which encodes ITU-656 format digital video data and I2S format digital audio data supplied from the TV input video/audio decoder 231 or the external video/audio input unit 232. The common unit 233 compression-codes the ITU-656 format digital video data and I2S format digital audio data to generate a compression-coded AV stream (i.e., video data and audio data of given format). This compression-coding is performed on the synchronous DRAM 240. The AV stream is transmitted to the bus interface unit 234.

The bus interface unit 234 is a PCI device and communicates with the system logic 100 via the bus connector 30 and the PCI bus 20. The bus interface unit 234 transfers the compression-coded AV stream to the system logic 100 via the bus connector 30 and the PCI bus 20. The bus interface 234 includes a power-saving control register 234a to which the driver 40 can gain access.

The power-saving control register 234a is used to set power-saving mode designation information by the driver 40. The power-saving mode designation information designates a power-saving mode for each of sections preset in the TV tuner/capture unit 123. In the present embodiment, the TV tuner/capture unit 123 manages its power saving for each of four sections of a TV input section, an external video input section, a common section and a bus interface section. The TV input unit 210 and TV input video/audio decoder 231 belong to the TV input section. The external video/audio unit 220 (external audio A/D converter 221) and external video/audio input unit 232 belong to the external video input section. The common unit 233 and synchronous DRAM 240 belong to the common section. The bus interface unit 234 and power-saving control circuit 235 belong to the bus interface section.

When the input source is a TV input, the external video input section need not operate and, in this case, it makes no matter that the external video input section is set in power-saving mode. When the input source is an external video input, the TV input section need not operate and, in this case, it makes no matter that the TV input section is set in power-saving mode. While no capture transfer operation is being performed, none of the sections (TV input section, external video input section and common section) other than the bus interface section need to operate and, in this case, it makes no matter that the sections are set in power-saving mode.

The power-saving control register 234a is, for example, a 3-bit register. The bits of the register 234a correspond to their respective sections of the TV input section, external video input section and common section. Two designation states "ON" and "OFF" are prepared to designate power saving for each of the sections by the power-saving control register 234a. The state "ON" represents setting of a section in non-power-saving mode (enabled state). The state "OFF" represents setting of a section in power-saving mode. When the bit of the power-saving control register 234a is "1," it corresponds to "ON." When the bit is "0," it corresponds to "OFF."

When the first power supply voltage #1 is applied to the power-saving control circuit 235, the circuit 235 outputs an inactive power-saving control signal 235a only during which period the "ON" state of the TV input section is designated by the power-saving control register 234a. When the first power supply voltage #1 is applied, the power-saving control circuit 235 outputs an inactive power-saving control signal 235b only during which period the "ON" state of the external video input section is designated by the power-saving control register 234a.

The TV input video/audio decoder 231, external video/audio input unit 232 and common unit 233 incorporate clock gates CG1, CG2 and CG3, respectively. The clock gates CG1, CG2 and CG3 are gate circuits for masking clock signals necessary for operating the circuits incorporating these clock gates in accordance with the states of bits of the power-saving control register 234a which correspond to the sections to which the circuits belong.

Figure 4A:
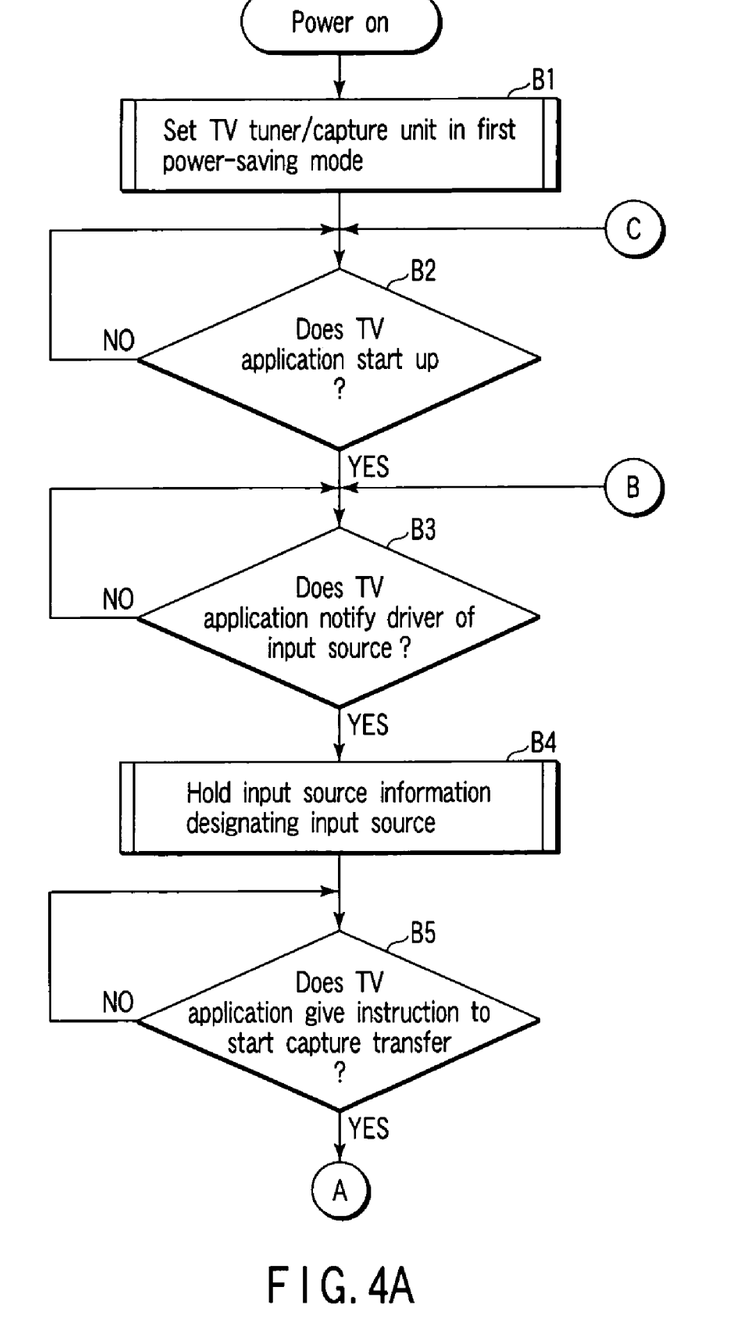
FIG. 4A is the first half of an exemplary flowchart describing a power-saving control process applied to the personal computer according to the embodiment of the invention.
Figure 4B:
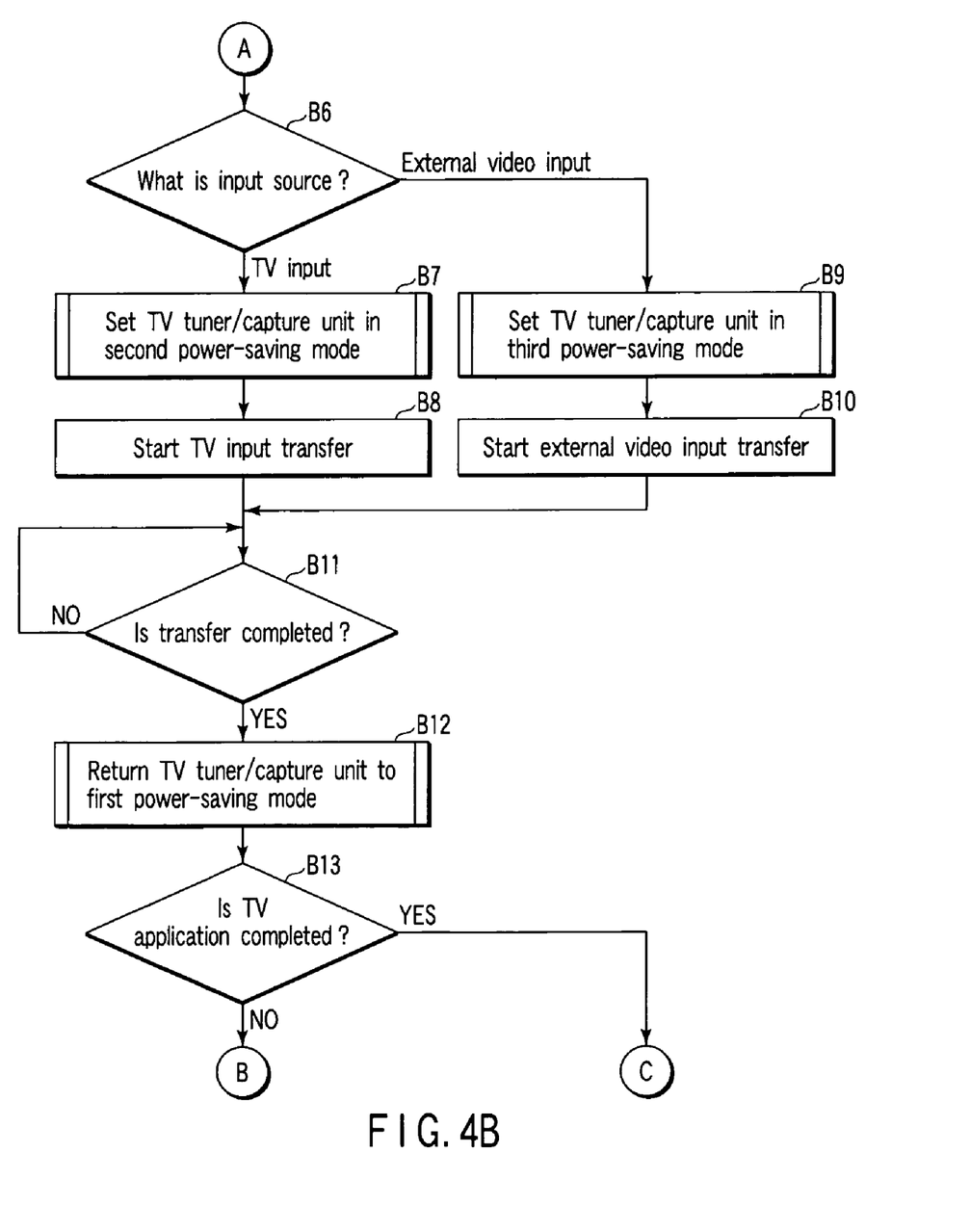
FIG. 4B is the second half of the exemplary flowchart describing a power-saving control process applied to the personal computer according to the embodiment of the invention.

A power-saving control process of the TV tuner/capture unit 123, which is performed by the TV tuner/capture driver 40 in the present embodiment, will be described with reference to the flowcharts shown in FIGS. 4A and 4B. First, the personal computer 10 is powered on. Then, a system power supply voltage is applied to the TV tuner/capture unit 123 from the power supply device in the system logic 100 via the bus connector 30. The first power supply circuit 201 generates a power supply voltage #1 from the system power supply voltage applied to the TV tuner/capture unit 123. The power supply voltage #1 is applied to the encoder/decoder unit 230 and the external video/audio unit 220. The bus interface unit 234 and power-saving control circuit 235 included in the encoder/decoder unit 230 are enabled when the power supply voltage #1 is applied to the unit 230. In other words, the bus interface unit 234 and power-saving control circuit 235 are enabled when the personal computer 10 is powered on.

When the personal computer 10 is powered on, the TV tuner/capture driver 40 performs a first power-saving mode setting process (block B1). Of the four sections in the TV tuner/capture unit 123, all the sections except the bus interface section are set in power-saving mode and, in other words, the TV input section, external video input section and common section are set in power-saving mode. The first power-saving mode is a mode which brings the greatest advantage of power saving in the TV tuner/capture unit 123, as is understood from a comparison with the second and third power saving modes described later.

Figure 5:
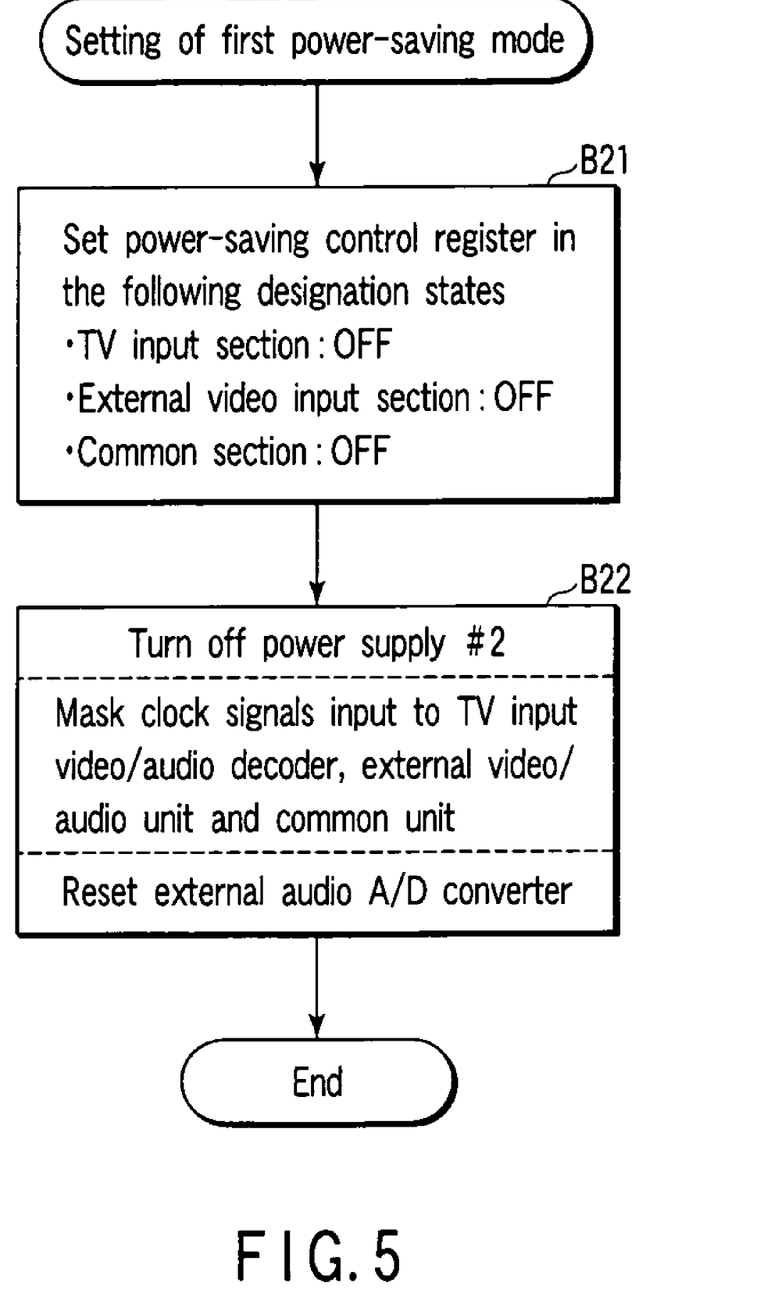
FIG. 5 is an exemplary flowchart of a first power-saving mode setting process performed in block B1 of the flowchart shown in FIG. 4A.

The first power-saving mode setting process performed in the above block B1 will be described in detail with reference to the flowchart shown in FIG. 5. The TV tuner/capture driver 40 sets the power-saving control register 234a in the bus interface unit 234 in the following designation states (block B21):

TV input section: OFF
External video input section: OFF
Common section: OFF

When the TV input section is set in OFF state, the power-saving control circuit 235 sets the power-saving control signal 235a in inactive state and, in this case, the second power supply circuit 202 turns off the power supply #2 (block B22). Thus, the TV input unit 210 (TV tuner module 211 and ghost reducer 212 in the TV input unit 210) is set in power-saving mode by turning off the power supply #2. In the present embodiment, the power supply voltage #2 is applied only to the TV input unit 210 in the TV tuner/capture unit 123. Even though the power supply #2 turns off when the TV input section need not operate, it has no influence upon any other sections.

When the external video input section is turned off, the power-saving control circuit 235 sets the power-saving control signal 235b in inactive state. Thus, the external audio A/D converter 221 of the external video/audio unit 220 is reset (block B22). In other words, the external audio A/D converter 221 is set in power-saving mode by soft reset. The power supply voltage #1 is applied to the external audio A/D converter 221 and also to the encoder/decoder unit 230. The encoder/decoder unit 230 includes a circuit such as the TV input video/audio decoder 231, which does not belong to the external video input section. However, the external audio A/D converter 221 is not set in power-saving mode by turning off the power supply #1. Even though the external audio A/D converter 221 is set in power-saving mode, it has no influence upon any other circuits (especially a circuit which does not belong to the external video input section).

When the TV input section is turned off, or when the bit of the power-saving control register 234a corresponding to the TV input section is set to "0," a clock signal input to the TV input video/audio decoder 231 is masked by the clock gate CG1 in accordance with the bit "0" (block B22). In other words, the clock signal is inhibited from being supplied to the TV input video/audio decoder 231.

Similarly, when the external video input section is turned off, a clock signal input to the external video/audio input unit 232 which belongs to the external video input section is masked by the clock gate CG2 (block B22). Similarly, when the common section is turned off, a clock signal input to the common unit 233 which belongs to the common section is masked by the clock gate CG3 (block B22).

If the clock signals input to the TV input video/audio decoder 231, external video/audio input unit 232 and common unit 233, which are included in the encoder/decoder unit 230, are masked, the decoder 231 and units 232 and 233 are inhibited from operating. Thus, the decoder 231 and units 232 and 233 can be decreased in power consumption. In other words, the decoder 231 and units 232 and 233 are set in power-saving mode by the clock gates. While the common unit (MPEG encoder) 233 is inhibited from operating, it does not gain access to the synchronous DRAM 240. The synchronous DRAM 240 can be decreased in power consumption accordingly. The synchronous DRAM 240, which is provided independently of the encoder/decoder unit 230 incorporating the common unit 233, is not directly controlled but can be set substantially in power-saving mode.

As described above, when the personal computer 10 is powered on, only the bus interface unit 234 and power-saving control circuit 235 included in the encoder/decoder unit 230 are enabled in the TV tuner/capture unit 123. In prior art, since an encoder/decoder unit is an LSI chip common to both input sources of a TV input and an external video input, it is always enabled and, in this case, some of the circuits included in the encoder/decoder unit consume useless power. In the present embodiment, however, power saving of each of the TV input video/audio decoder 231, external video/audio input unit 232 and common unit 233 included in the encoder/decoder unit 230 is controlled independently by a clock gate. After the personal computer 10 is powered on, some of the circuits in the encoder/decoder unit 230, which need not operate, can be prevented from consuming useless power, though the power supply voltage #1 is constantly applied to the encoder/decoder unit 230. Moreover, only the circuits in the unit 230, which are to operate, can be enabled with reliability.

After that, the TV tuner/capture driver 40 monitors whether the TV application 50 starts (block B2). In the present embodiment, the TV tuner/capture driver 40 communicates with an OS via a dedicated application program interface (API) to detect that the TV application 50 starts and exits.

When the TV tuner/capture driver 40 detects that the TV application 50 starts, it monitors whether the TV application 50 notifies the driver 40 of an input source (block B3). In the present embodiment, the TV application 50 automatically selects a TV input as the input source immediately after the TV application 50 starts. The TV application 50 (the input source notification module 51 of the TV application 50) notifies the TV tuner/capture driver 40 of the TV input as the input source. The input source can be changed by operating the input selection button 15C in the input operation panel 15 or by performing an input selection operation on a window corresponding to the TV application 50.

When the TV application 50 notifies the TV tuner/capture driver 40 of the input source, the driver 40 holds input source information that designates the input source (block B4). The input source information is part of management information for managing the TV tuner/capture unit 123 by the driver 40.

When the TV application 50 (the input source notification module 51 thereof) notifies the TV tuner/capture driver 40 of the input source, the TV application 50 (the transfer command issuance module 52 thereof) waits until video data corresponding to the input source can be transferred and issues a transfer command to the driver 40.

When the TV tuner/capture driver 40 executes the above block B4, it monitors whether the TV application 50 issues a transfer command, or whether the TV application 50 gives an instruction to start a capture transfer (block B5). If the TV application 50 gives the instruction, the TV tuner/capture driver 40 determines the previously-notified input source (currently-designated input source) on the basis of the input source information held in block B4 (block B6). It determines whether the currently-designated input source is a TV input or an external video input.

If the currently-designated input source is a TV input, the TV tuner/capture driver 40 determines that the TV input section and the common section of the four sections in the TV tuner/capture unit 123 need to operate afresh. The TV tuner/capture driver 40 performs a second power-saving mode setting process (block B7). In this process, in addition to the currently-enabled bus interface section (bus interface unit 234), the TV input section and the common section are enabled afresh. The external video input section is set (kept) in power-saving mode. In other words, the external video/audio unit 220 (external audio A/D converter 221) and the external video/audio input unit 232 (in the encoder/decoder unit 230), which belong to the external video input section, are set (kept) in power-saving mode.

If the TV input section and the common section are enabled afresh in addition to the bus interface section, the TV tuner/capture unit 123 can perform the following capture transfer operation. The TV tuner/capture unit 123 can receive a TV broadcast signal and compression-code the received signal into an AV stream (video data), thereby performing a capture transfer operation to output the AV stream onto the PCI bus 20. The TV tuner/capture driver 40 starts to transfer the compression-coded AV stream (block B8). The transfer of the AV stream in block B8 is referred to as a TV input transfer. In the TV input transfer, the compression-coded AV stream is transferred to and decoded by the TV application 50, and then displayed on the LCD 17. The compression-coded AV stream is sometimes transferred to and recorded on the HDD 121 by the execution of the application 50 according to a user's instruction.

If the currently-designated input source is determined as an external video input in block B6, the TV tuner/capture driver 40 determines that the external video input section and the common section of the four sections in the TV tuner/capture unit 123 need to operate afresh. The TV tuner/capture driver 40 performs a third power-saving mode setting process (block B9). In this process, in addition to the currently-enabled bus interface section (bus interface unit 234), the external video input section and the common section are enabled afresh. The TV input section is set (kept) in power-saving mode. In other words, the TV input unit 210 (TV tuner module 211 and ghost reducer 212) and the TV input video/audio input decoder 231 (in the encoder/decoder unit 230), which belong to the TV input section, are set (kept) in power-saving mode.

If the external video input section and the common section are enabled afresh in addition to the bus interface section, the TV tuner/capture unit 123 can perform the following capture transfer operation. The TV tuner/capture unit 123 can receive a video/audio signal (video signal) from an external device and compression-code the signal into an AV stream, thereby performing a capture transfer operation to output the AV stream onto the PCI bus 20. The TV tuner/capture driver 40 starts to transfer the compression-coded AV stream (block B10). The transfer of the AV stream in block B10 is referred to as an external video input transfer. In the external video input transfer, the compression-coded AV stream is transferred to and decoded by the TV application 50, and then displayed on the LCD 17. The compression-coded AV stream is sometimes transferred to and recorded on the HDD 121 according to a user's instruction.

Figure 6:
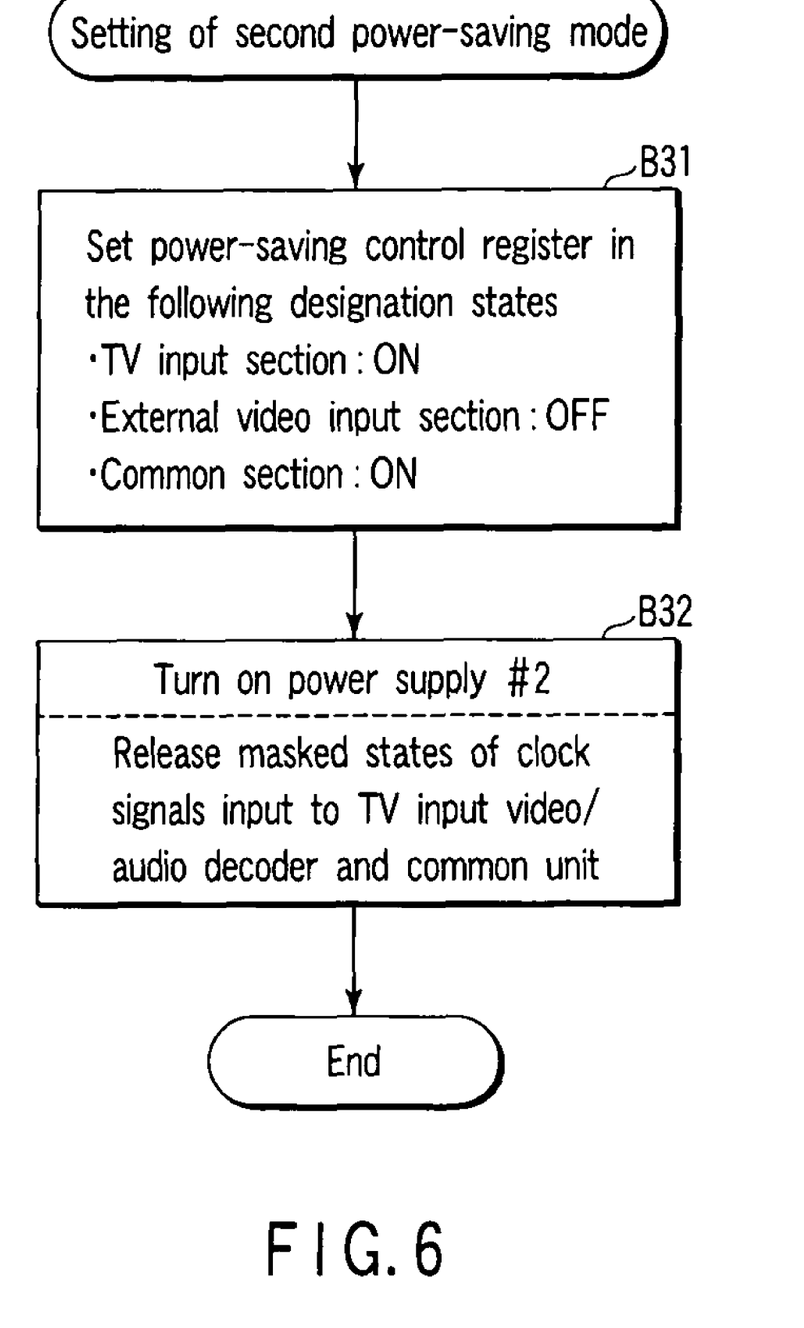
FIG. 6 is an exemplary flowchart of a second power-saving mode setting process performed in block B7 of the flowchart shown in FIG. 4B.

The second power-saving mode setting process performed in block B7 will be described with reference to the flowchart shown in FIG. 6. The TV tuner/capture driver 40 sets the power-saving control register 234a in the bus interface unit 234 in the following designation states (block B31):

TV input section: ON
External video input section: OFF
Common section: ON

When the TV input section is turned on (block B31), the power-saving control circuit 235 sets the power-saving control signal 235a in active state and, in this case, the second power supply circuit 202 turns on a power supply #2 (block B32). Thus, the TV input unit 210 (TV tuner module 211 and ghost reducer 212 in the TV input unit 210) is changed from a power-saving mode in which the power supply #2 turns off to an enabled state in which the power supply #2 turns on.

When the external video input section is turned off (block B31), the power-saving control circuit 235 sets the power-saving control signal 235b in inactive state. The reset state of the external audio A/D converter 221 of the external video/audio unit 220 is maintained. In other words, the external audio A/D converter 221 is set in power-saving mode by soft reset.

When the TV input section is turned on (block B31), or when the bit of the power-saving control register 234a corresponding to the TV input section is set to "1," the clock gate CG1 turns on. Then, the clock gate CG1 releases the masked state of a clock signal input to the TV input video/audio decoder 231 that belongs to the TV input section (block B32). The clock signal is thus supplied to the TV input video/audio decoder 231. The TV input video/audio decoder 231 is changed to an enabled state from the power-saving mode by the clock gate. Similarly, when the common section is turned on (block B31), the clock gate CG3 releases the masked state of a clock signal input to the common unit 233 that belongs to the common section (block B32). Thus, the common unit 233 is changed to an enable state from the power-saving mode by the clock gate. The common unit (MPEG encoder) 233 in its enabled state gains access to the synchronous DRAM 240.

The external video input section is turned off (block B31) and, in this case, a clock signal input to the external video/audio input unit 232 that belongs to the external video input section is still masked by the clock gate CG2. Thus, the external video/audio input unit 232 is maintained in power-saving mode by the clock gate.

Figure 7:
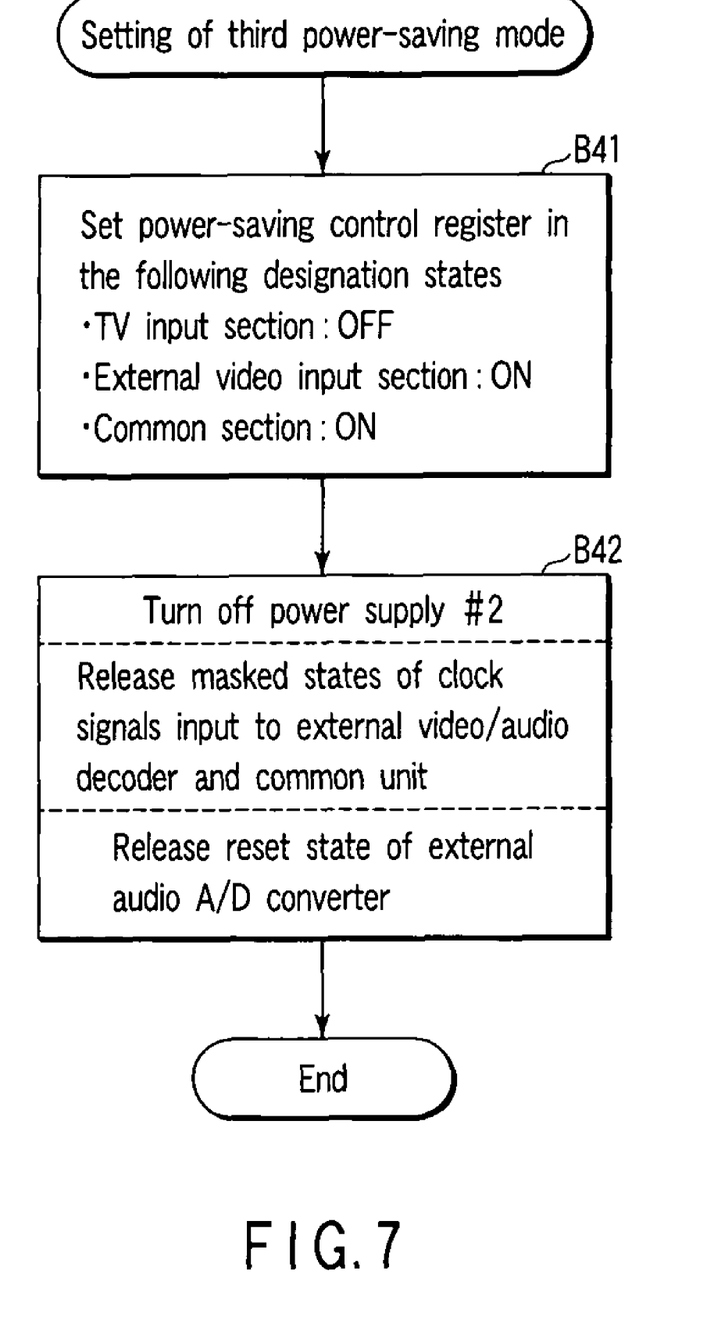
FIG. 7 is an exemplary flowchart of a third power-saving mode setting process performed in block B9 of the flowchart shown in FIG. 4B.

The third power-saving mode setting process performed in block B9 will be described with reference to the flowchart shown in FIG. 7. The TV tuner/capture driver 40 sets the power-saving control register 234a in the bus interface unit 234 in the following designation states (block B41):

TV input section: OFF
External video input section: ON
Common section: ON

When the TV input section is turned off (block B41), the power-saving control circuit 235 sets the power-saving control signal 235a in inactive state and, in this case, the second power supply circuit 202 turns off the power supply #2 (block B42). The power-saving mode of the TV input unit 210 (TV tuner module 211 and ghost reducer 212 in the TV input unit 210) is therefore maintained.

When the external video input section is turned on, the power-saving control circuit 235 sets the power-saving control signal 235b in active state. The reset state of the external audio A/D converter 221 in the external video/audio unit 220 is released (block B42). In other words, the external audio A/D converter 221 is changed to an enabled state from the power-saving mode by soft reset.

When the external video input section is turned on (block B41), or when the bit of the power-saving control register 234a corresponding to the external video input section is set to "1," the clock gate CG2 turns on. Then, the clock gate CG2 releases the masked state of a clock signal input to the external video/audio input unit 232 that belongs to the external video input section (block B42). The clock signal is supplied to the external video/audio input unit 232. The unit 232 is changed to an enabled state from the power-saving mode by the clock gate. Similarly, when the common section is turned on (block B41), the clock gate CG3 releases the masked state of a clock signal input to the common unit 233 that belongs to the common section (block B42). Thus, the common unit 233 is changed to an enable state from the power-saving mode by the clock gate.

The TV input section is turned off (block B41) and, in this case, a clock signal input to the TV input video/audio decoder 231 that belongs to the TV input section is still masked by the clock gate CG1. The power-saving mode of the TV input video/audio decoder 231 is therefore maintained by the clock gate.

When a TV input transfer (block B8) or an external video input transfer (block B10) starts, the TV tuner/capture driver 40 waits for the TV input transfer or the external video input transfer to be completed (the capture transfer to be completed) (block B11).

If the TV input transfer or the external video input transfer is completed, the TV tuner/capture driver 40 returns the TV tuner/capture unit 123 to the first power-saving mode at once (block B12). Accordingly, the unit 123 returns to a mode in which the greatest advantage of power saving is obtained (in which the personal computer 10 is powered on).

The TV tuner/capture driver 40 checks whether the TV application 50 exits as the TV input transfer or the external video input transfer is completed (block B13). If the TV application 50 does not exit, the TV tuner/capture driver 40 returns to block B3 and monitors whether the TV application 50 newly notifies the driver 40 of an input source. If the TV application 50 exits, the TV tuner/capture driver 40 returns to block B2 and waits for the TV application 50 to start again.

In the notebook personal computer 10 incorporating the TV tuner/capture unit 123, when a capture transfer is completed, the capture unit 123 in its entirety is set in the first power-saving mode that brings the greatest advantage of power saving, as is the capture unit 123 when the personal computer 10 is powered on. The first power-saving mode is not released even though the TV application 50 makes a notification about a new input source. The first power-saving mode continues until the notification is made by the TV application 50 and then the TV application 50 gives an instruction to start a data transfer. As compared with the prior art, the TV tuner/capture unit 123 in its entirety can be kept as far as possible in power-saving mode that brings the greatest advantage. The power consumption of the personal computer 10 in power-saving mode is almost equal to that of a notebook personal computer incorporating no TV tuner/capture unit. In the present embodiment, therefore, a user can be provided with the operating time of the battery-operated computer 10, which is approximate to that of the notebook personal computer.

In the present embodiment, a processing unit which does not require one of an external video input or a TV input can reliably be set in power-saving mode in accordance with an input source notified by the TV application 50 during the capture transfer. Of a plurality of processing units in the single-chip encoder/decoder unit 230, which is always enabled if the unit 230 is applied to prior art, the TV input video/audio decoder 231, external video/audio input unit 232 and common unit 233 can be set in power-saving mode by the clock gates CG1, CG2 and CG3, respectively. Even during the capture transfer, useless power can be prevented from being consumed by an unnecessary processing unit in the TV tuner/capture unit 123. In the present embodiment, therefore, the personal computer 10 incorporating the TV tuner/capture unit 123 can be decreased in power consumption further.

The advantage unique to the present embodiment is that the processing units except the bus interface unit 234 in the single-chip encoder/decoder unit 230 can be set in power-saving mode by their respective clock gates. Paying attention to this advantage, the following power-saving control can be applied to the present embodiment. Assume first that the TV tuner/capture driver 40 (the input source detection module 41 thereof) detects that the TV application 50 notifies the driver 40 of an input source. At the time of the detection, the TV tuner/capture unit 123 can be set in power-saving mode (second or third power-saving mode) corresponding to the detected input source. Even though such a configuration (power-saving control) is applied, the TV tuner/capture unit 123 can be decreased in power consumption more than the prior art.

While certain embodiments of the inventions have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from spirit of the inventions. The accompanying claims and their equivalents are intended to cover such forms or modifications as would fall within the scope and spirit of the inventions.

What is claimed is:

1. An information processing apparatus which has a bus used to transfer various data items including video data reproduced by execution of a video reproduction program and which is capable of displaying the data items on a display device, the apparatus comprising:

a receiving device which receives a video signal from an input source corresponding to one of a plurality of external sources, which is required for the execution of the video reproduction program, and converts the video signal into video data of given format, the receiving device including a plurality of processing units containing an interface unit electrically connected to the bus, and the interface unit being activated by powering on the information processing apparatus to transmit the video data to the bus, the processing units including:

a plurality of first processing units which receive video signals from the external sources, respectively;

a plurality of second processing units which convert the video signals received by the first processing units into video data of format common to the external sources; and a third processing unit common to the external sources, which converts the video data converted by one of the second processing units, corresponding to an input source required for the execution of the video reproduction program into the video data of given format; and a control unit which controls the receiving device in accordance with the execution of the video reproduction program, the control unit including:
- an input source detection module which detects an input source necessary for the execution of the video reproduction program;
- a transfer instruction detection module which detects a video data transfer instruction from the video reproduction program; and
- a power-saving control module configured to activate some of the processing units except the interface unit when the transfer instruction detection module detects the video data transfer instruction, and to set others of the processing units in power-saving mode, said some of the processing units receiving a video signal from the input source detected by the input source detection module and converting the video signal into video data of given format, and wherein:
- the second processing units, the third processing unit, and the interface unit are included in a single-chip LSI;
- the second processing units and the third processing unit each incorporate a clock gate which masks a clock signal supplied to a corresponding one of the processing units; and
- when the transfer instruction detection module detects the video data transfer instruction, the power-saving control module activates one of the first processing units, which corresponds to the input source detected by the input source detection module, one of the second processing units, which corresponds to the detected input source, and the third processing unit, and sets all of other first processing units and other second processing units in power-saving mode, the power-saving control module controlling the clock gate to save power of each of the second processing units and the third processing unit.

2. The information processing apparatus according to claim 1, wherein the power-saving control module sets all of the processing units except the interface unit in power-saving mode when the information processing apparatus is powered on.

3. The information processing apparatus according to claim 2, wherein the power-saving control module resets the processing units except the interface unit in the power-saving mode of the information processing apparatus that is powered on, in accordance with completion of a video data transfer instructed by the video reproduction program.

4. The information processing apparatus according to claim 1, wherein the power-saving control module sets all of the first processing units, the second processing units and the third processing unit in power-saving mode when the information processing apparatus is powered on.

5. The information processing apparatus according to claim 4, wherein the power-saving control module resets all of the first processing units, the second processing units and the third processing unit in the power saving mode of the information processing apparatus that is powered on, in accordance with completion of a video data transfer indicated by the video reproduction program.

6. The information processing apparatus according to claim 1, wherein the receiving device includes:
- a first power supply circuit which receives a system power supply voltage as a power supply voltage of the information processing apparatus to generate a first power supply voltage that is applied to the LSI and some of the first processing units; and
- a second power supply circuit which receives the system power supply voltage to generate a second power supply voltage that is applied to others of the first processing units, the second power supply voltage being different from the first power supply voltage, and
wherein the power-saving module resets said some of the first processing units to save power of said some of the first processing units, and inhibits the second power supply voltage from being generated from the second power supply circuit to save power of the others of the first processing units.

7. The information processing apparatus according to claim 6, wherein:
- the interface unit includes a power-saving control register in which the power-saving control module sets power-saving mode designation information to designate a power-saving mode of the first processing units and the second processing units corresponding to the external sources and a power-saving mode of the third processing unit, the power-saving mode of the first processing units and the second processing units corresponding to each of the external sources;
- the LSI includes a power-saving control circuit configured to output a first control signal to inhibit the second power supply voltage from being generated from the second power supply circuit and a second control signal to reset said some of the first processing units, based on the power-saving mode designation information set in the power-saving control register;
- the clock gates incorporated in the second processing units and the third processing unit are controlled based on the power-saving mode designation information set in the power-saving control register;
- the second power supply circuit inhibits the second power supply voltage from being generated in response to the first control signal; and
- said some of the first processing units are reset in response to the second control signal.

8. The information processing apparatus according to claim 1, wherein:
- one of the first processing units is a television input unit which receives a video signal from a television broadcast signal that carries the video signal;
- another one of the first processing units is an external video/audio unit which receives a video signal from an external video/audio device;
- one of the second processing units is a television input video/audio decoder which processes the video signal received by the television input unit to generate the video data of format common to the external sources; and
- another one of the second processing units is an external video/audio input unit which processes the video signal received by the external video/audio unit to generate the video data of format common to the external sources.

9. A method of controlling power saving of a receiving device of an information processing apparatus containing a bus used to transfer various data items including video data reproduced by execution of a video reproduction, program, the information processing apparatus being capable of displaying the data items on a display device, the receiving device receiving a video signal from an input source corresponding to one of a plurality of external sources, which is required for the execution of the video reproduction program, and converting the video signal into video data of given format, the receiving device including a plurality of processing units containing an interface unit electrically connected to the bus, and the interface unit being activated by powering on the information processing apparatus to transmit the video data to the bus, and the processing units including a plurality of first processing units, a plurality of second processing units and a third processing unit, and wherein the second processing units, the third processing unit and the interface unit are included in a single-chip LSI, and the second processing units and the third processing unit each incorporates a clock gate which masks a clock signal supplied to a corresponding one of the processing units, the method comprising:

detecting an input source, required for the execution of the video reproduction program, which is notified by video reproduction program;

waiting for a video data transfer instruction to issue from the video reproduction program when the input source is detected; and     activating some of the processing units except the interface unit and setting others of the processing units in power-saving mode when the video data transfer instruction issues from the video reproduction program, said some of the processing units receiving a video signal from the detected input source and converting the video signal into video data of given format, said some of the processing units being one of the first processing units, which corresponds to the detected input source, one of the second processing units, which corresponds to the detected input source, and the third processing unit, said others of the processing units being all of other first processing units and other second processing units, and the second processing units and the third processing unit each being activated or set in the power-saving mode by controlling the clock gate.

10. The method according to claim 9, further comprising setting all of the processing units except the interface unit in power-saving mode when the information processing apparatus is powered on.

11. The method according to claim 10, further comprising:

waiting for completion of a video data transfer instructed by the video reproduction program; and     resetting the processing units except the interface unit in the power-saving mode of the information processing apparatus that is powered on, after the completion of the video data transfer.

12. The method according to claim 11, wherein the detecting is performed again by confirming that the video reproduction program does not exit, when the processing units except the interface unit are set in the power-saving mode of the information processing apparatus that is powered on.

* * * * *